(12) United States Patent
Linam et al.

(10) Patent No.: US 7,260,752 B2
(45) Date of Patent: Aug. 21, 2007

(54) METHOD AND APPARATUS FOR RESPONDING TO CRITICAL ABSTRACTED PLATFORM EVENTS IN A DATA PROCESSING SYSTEM

(75) Inventors: Stephen Dale Linam, Austin, TX (US); Gundam Raghuswamyreddy, Austin, TX (US); Vikramjit Sethi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 10/782,643

(22) Filed: Feb. 19, 2004

(65) Prior Publication Data

US 2005/0193271 A1 Sep. 1, 2005

(51) Int. Cl.
*G06F 11/00* (2006.01)
(52) U.S. Cl. ....................................................... 714/48
(58) Field of Classification Search .................... 714/48
See application file for complete search history.

(56) References Cited

U.S. PATENT DOCUMENTS

| | | | |
|---|---|---|---|
| 4,031,517 A | 6/1977 | Hirtle | 364/200 |
| 5,301,308 A | 4/1994 | Daar et al. | 395/575 |
| 5,371,871 A | 12/1994 | Spllo | 395/425 |
| 5,838,906 A | 11/1998 | Doyle et al. | 395/200.32 |
| 5,889,978 A | 3/1999 | Jayakumar | 395/500 |
| 5,923,890 A | 7/1999 | Kubala et al. | 395/800.01 |
| 5,943,507 A | 8/1999 | Cornish et al. | 395/868 |
| 6,185,523 B1 | 2/2001 | Itskin et al. | 703/28 |
| 6,279,046 B1 * | 8/2001 | Armstrong et al. | 710/5 |
| 6,332,180 B1 * | 12/2001 | Kauffman et al. | 711/153 |
| 6,370,606 B1 | 4/2002 | Bonola | 710/260 |
| 6,496,891 B1 | 12/2002 | Cluff et al. | 710/260 |
| 6,622,185 B1 | 9/2003 | Johnson et al. | 710/48 |
| 6,792,564 B2 * | 9/2004 | Ahrens et al. | 714/45 |
| 6,901,537 B2 * | 5/2005 | Dawkins et al. | 714/43 |
| 6,910,142 B2 * | 6/2005 | Cross et al. | 713/324 |
| 6,920,587 B2 * | 7/2005 | Dawkins et al. | 714/48 |
| 6,988,226 B2 * | 1/2006 | Koning et al. | 714/57 |
| 7,080,230 B2 * | 7/2006 | Bennett et al. | 711/173 |
| 2002/0010811 A1 | 1/2002 | Arndt et al. | 710/5 |
| 2003/0163768 A1 | 8/2003 | Dawkins et al. | 714/43 |
| 2005/0166075 A1 * | 7/2005 | Hack | 713/320 |

FOREIGN PATENT DOCUMENTS

JP 2003122462 4/2003

OTHER PUBLICATIONS

IBM Research Disclosure 447161, "Method for Hardware Console Surveillance in a pSeries eServer", Jul. 2001, p. 1251.

* cited by examiner

*Primary Examiner*—Robert Beausoliel
*Assistant Examiner*—Philip Guyton
(74) *Attorney, Agent, or Firm*—Duke W. Yee; Diana R. Gerhardt; Theodore D. Fay, III

(57) ABSTRACT

A method, apparatus, and computer instructions for generating a hardware interrupt to the operating system in response to detecting a presence of the event in the platform. The event is stored in a partition queue associated with a partition firmware in response to the presence of the event. The event is identified in the partition queue, in response to receiving a request to check the hardware interrupt in the partition firmware. The event is processed in response to identifying the event.

24 Claims, 4 Drawing Sheets

100 DATA PROCESSING SYSTEM

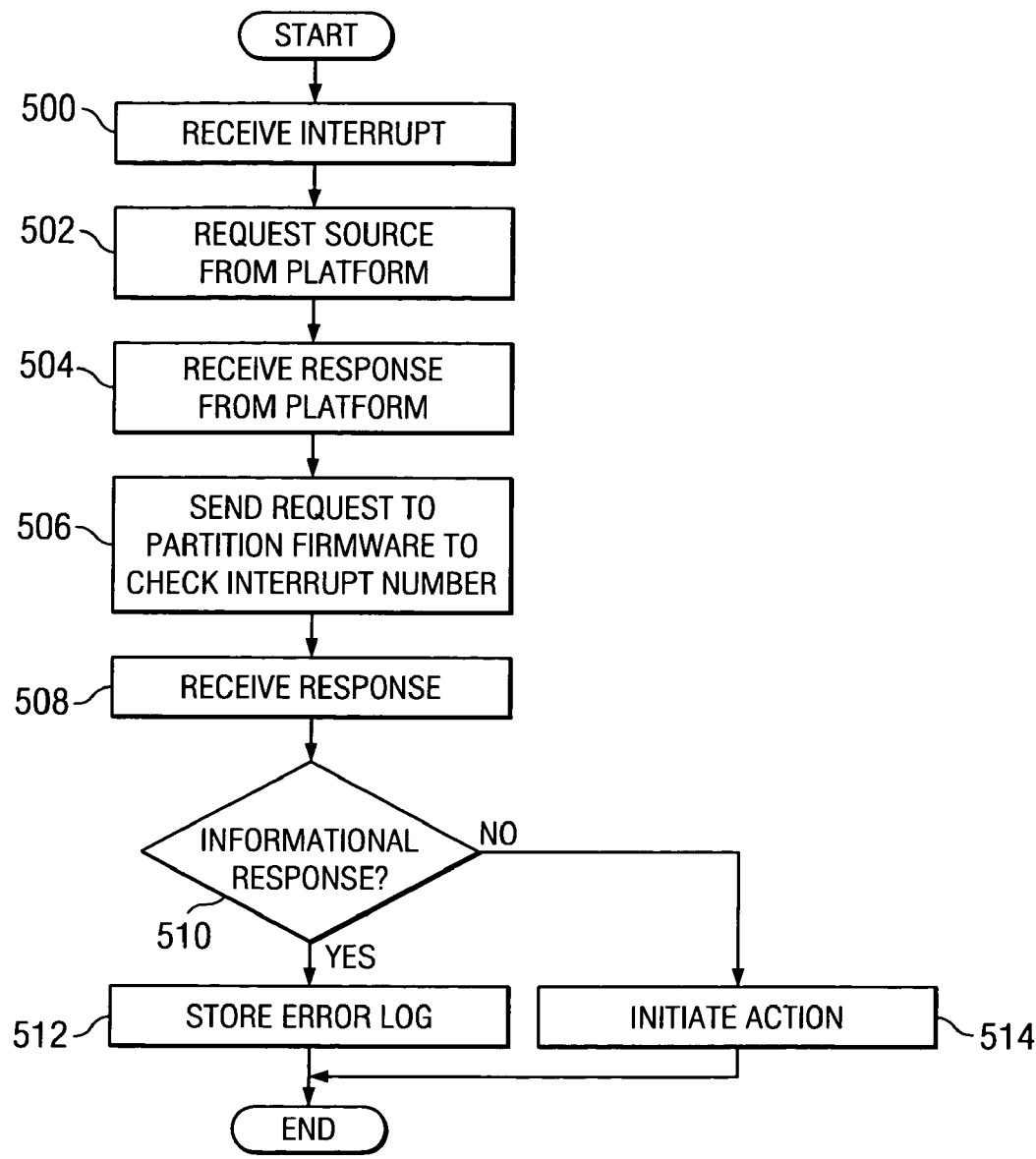

METHOD AND APPARATUS FOR RESPONDING TO CRITICAL ABSTRACTED PLATFORM EVENTS IN A DATA PROCESSING SYSTEM

BACKGROUND OF THE INVENTION

1. Technical Field

The present invention relates generally to an improved data processing system and in particular to a method and apparatus for processing data. Still more particularly, the present invention relates to a method, apparatus, and computer instructions for responding to events.

2. Description of Related Art

Increasingly large symmetric multi-processor data processing systems, such as IBM eServer P690, available from International Business Machines Corporation, DHP9000 Superdome Enterprise Server, available from Hewlett-Packard Company, and the Sunfire 15K server, available from Sun Microsystems, Inc. are not being used as single large data processing systems. Instead, these types of data processing systems are being partitioned and used as smaller systems. A partitioned functionality within a data processing system allows multiple copies of a single operating system or multiple heterogeneous operating systems to be simultaneously run on a single data processing system platform. Partitioning of a data processing system may be physical and/or logical. A partition, within which an operating system image runs, is assigned a non-overlapping subset of the platforms resources. These platform allocatable resources include one or more architecturally distinct processors with their interrupt management area, regions of system memory, and input/output (I/O) adapter bus slots. The partition's resources are represented by the platform's firmware to the operating system image.

Each distinct operation system or image of an operating system running within a platform is protected from each other such that software errors on one logical partition cannot affect the correct operations of any of the other partitions. This protection is provided by allocating a disjointed set of platform resources to be directly managed by each operating system image and by providing mechanisms for insuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocatable resources within the platform. With respect to hardware resources in a logical partitioned data processing system, these resources are disjointly shared among various partitions. These resources may include, for example, input/output (I/O) adapters, memory DIMMs, non-volatile random access memory (NVRAM), and hard disk drives. Each partition within an LPAR data processing system may be booted and shut down over and over without having to power-cycle the entire data processing system.

In a logical partitioned data processing system, a number of scenarios or instances may occur in which the platform firmware and hardware need to inform the operating systems or the partition firmware of critical platform events that are abstracted from the partition. Examples of critical platform events include a loss of power, a low battery, a system bus failure, or a high temperature that a result in damage to components in the logical partitioned data processing system.

In current architectures, the platform firmware is unable to directly call an operating system or partition firmware within the logical partitioned data processing system. Runtime partition firmware is a passive layer of software that can only be invoked by the operating system. Although some hardware owned by the partition may seek immediate service by interrupting the device driver for the hardware, platform hardware is present that is abstracted from the partition and cannot communicate directly with the operating system.

One mechanism used to detect events in the platform relies on the operating system periodically polling the partition firmware to identify new events occurring in the platform. This approach is inadequate when an immediate response to an event is needed. For example, storage servers are required to respond immediately to power conditions and other events that could cause data corruption or data loss. Therefore, it would be advantageous to have an improved method, apparatus, and computer instructions for enabling a partition to respond to events generated by platform hardware.

SUMMARY OF THE INVENTION

The present invention provides a method, apparatus, and computer instructions for generating a hardware interrupt to the operating system in response to detecting a presence of the event in the platform. The event is stored in a partition queue associated with a partition firmware in response to the presence of the event. The event is identified in the partition queue, in response to receiving a request to check the hardware interrupt in the partition firmware. The event is processed in response to identifying the event.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process for handling an interrupt by an operating system in accordance with a preferred embodiment of the present invention.

DETAILED DESCRIPTION OF THE PREFERRED EMBODIMENT

Figure 1:
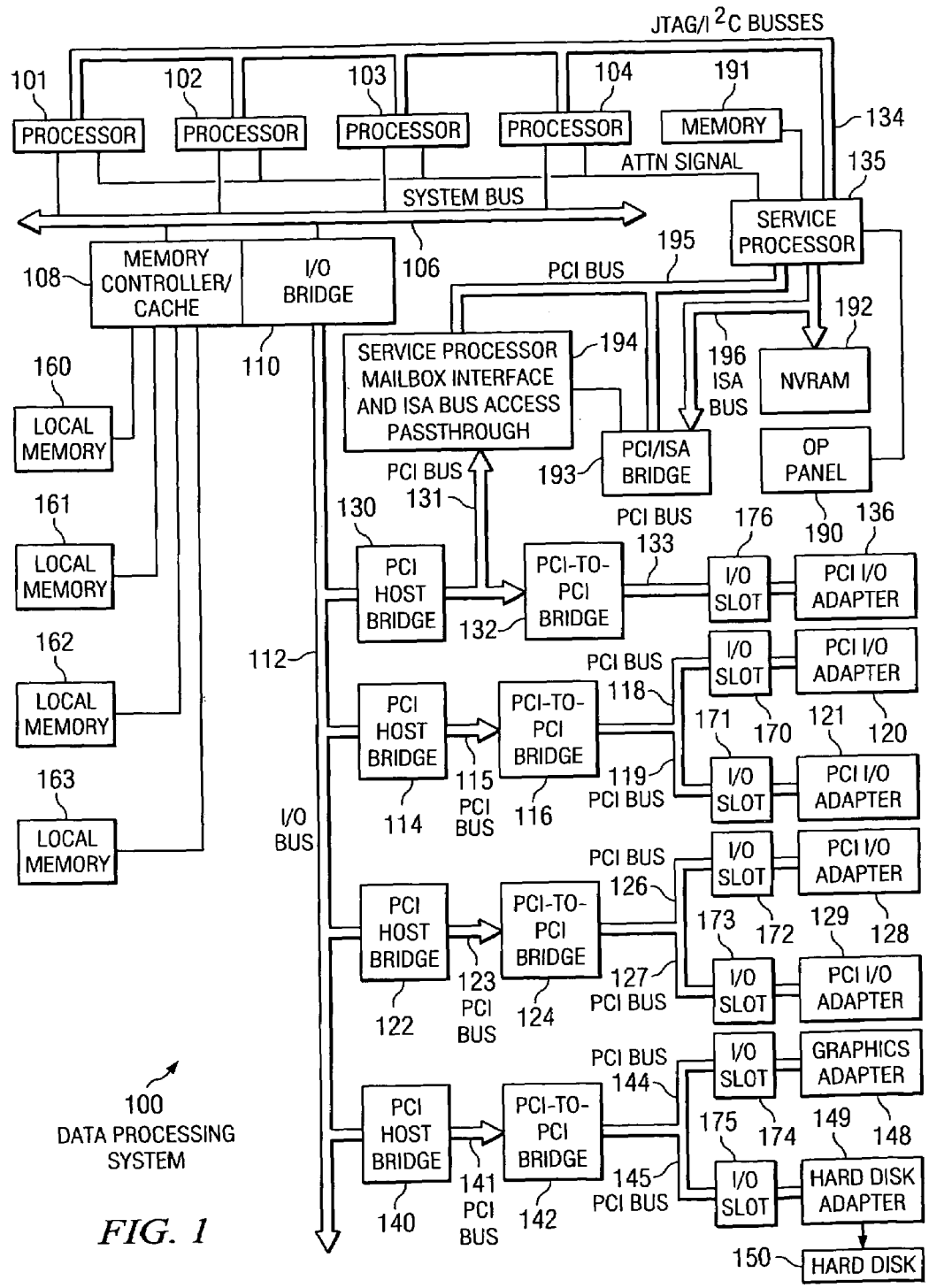
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106.

For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI-bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATS), and memory tests on all elements found by interrogating the host processors 101-104, memory controller/cache 108, and I/O bridge 110. Any error information for failures detected during the BISTs, BATS, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program-Loads (IPLs). IPLs are also sometimes referred to as a "boot" or "bootstrap".

Data processing system 100 may be implemented using various commercially available computer systems. For example, data processing system 100 may-be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
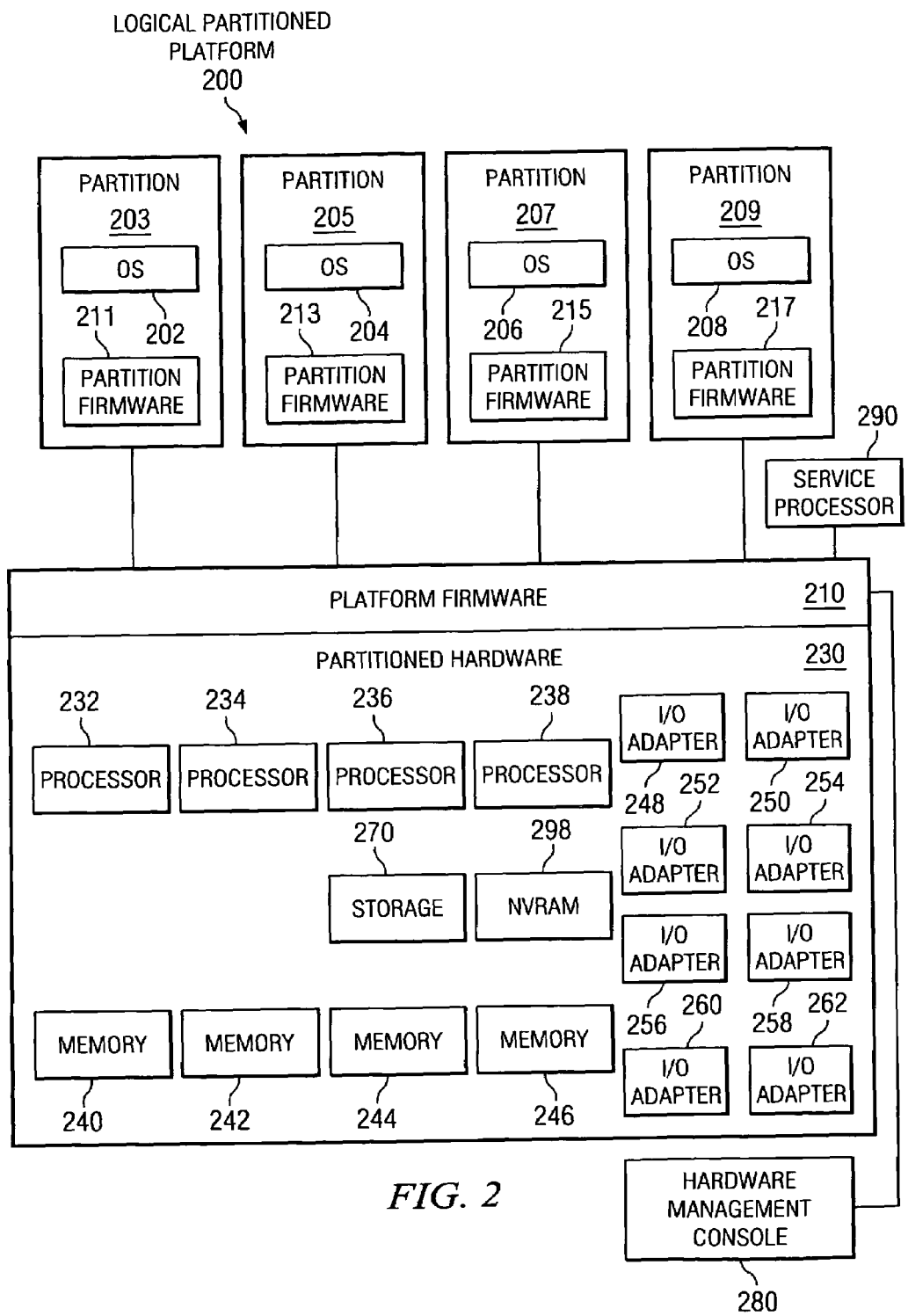
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The present invention provides a method, apparatus, and computer instructions for allowing a partition to respond to critical events occurring in a platform. As used herein, the platform includes the firmware and hardware for components in the logical partition data processing system. Platform firmware is unable to directly invoke or send calls to the operating system or partition firmware. In other words, these calls cannot be sent to the partition directly by the platform firmware. The mechanism of the present invention involves the platform forcing the operating system to respond to an event using a hardware external interrupt. This mechanism provides an immediate response as compared to the polling mechanism that is currently used. Polling typically occurs over a longer period of time and is not immediate when compared to the use of hardware interrupts. For example, polling may occur once a minute, while an interrupt is handled in a few microseconds.

In the illustrative examples, platform firmware places information about the event in a queue associated with the partition prior to raising or generating the hardware interrupt. The queues associated with partitions are also referred to as partition queues. These partition queues are software queues. In other words, a partition queue is a block of memory owned by partition firmware and registered by the partition firmware with the platform firmware at boot time. As a result, an event may be placed in this block of memory or any other partition address that has been previously negotiated between the partition firmware and the platform firmware. In these examples, the partition queue is registered by partition firmware at boot time. Additionally, the interrupt is presented to the operating system in a boot time device tree. Thereafter, the operating system registers the interrupt with the platform firmware. When the operating system detects this hardware interrupt, the interrupt handler for the operating system calls the platform firmware to read the source and priority of the interrupt.

In response, the platform firmware provides the source that is not owned by the operating system. The operating system then queries the partition firmware regarding information about the event. This information is found in the queue and is processed. The processing may include the partition firmware initiating corrective or preventative actions. This processing may involve sending the information to the operating system without taking any other action.

In this manner, the mechanism of the present invention provides a way to relay platform specific information to a partition from hardware that is abstracted from the partition. Abstracted hardware, as used herein, is any hardware that the system cannot understand. In other words, abstracted hardware is any resource owned by the platform, but is not owned by the partition. For example, an operating system does not understand events regarding power or temperature because no device drivers are present for the sensors that detect these parameters in the platform. These sensors are examples of abstracted hardware.

Figure 3:
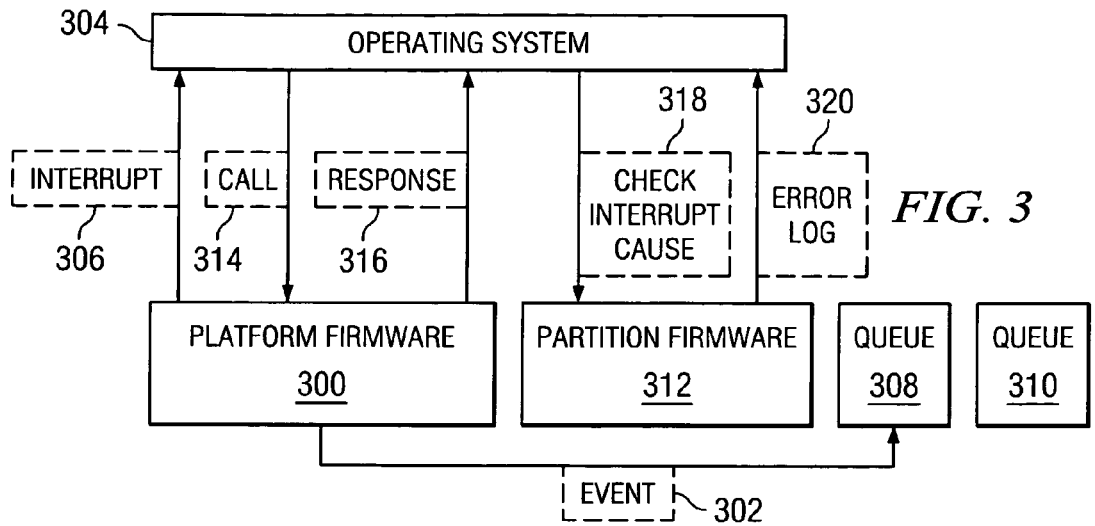
FIG. 3 is a diagram of components used in responding to events in a logical partition data processing system in accordance with a preferred embodiment of the present invention.

Turning next to FIG. 3, a diagram of components used in responding to events in a logical partition data processing system is depicted in accordance with a preferred embodiment of the present invention. In this illustrative example, platform 300 contains the hardware and firmware for the hardware. When a condition warrants generation of an event, interrupt 306 is generated and sent to operating system 304. Operating system 304 may be an operating system in a logical partitioned data processing system, such as operating system 202 in FIG. 2. Interrupt 306 is a hardware interrupt. Interrupt 306 is an external interrupt directed to a processor owned by a target partition owned by operating system 304.

In these examples, prior to raising interrupt 306, platform 300 stores event 302 in a queue, such as queue 308 or queue 310. Event 302 also includes information relating to the condition giving rise to the generation of event 302. This information may include any information needed to identify an action to handle the event. These actions include corrective or preventative actions or may only require monitoring of the condition or resource associated with the condition. Different types of information may be stored in a queue depending on the type of exception. For example, an event on a partition queue assigned for power events may indicate one of the following conditions: power lost, running on battery; power lost, battery or ups low; power restored; battery has been added to the platform; and battery has been removed from platform. If power is lost and the system is running on battery power, the platform firmware may infer that the operating system should check periodically to see if the power is restored. If the power is not restored after some period of time the system is shut down. In the case that power is lost and the battery is low, the platform firmware tells the operating system to begin shutting down the system immediately.

An event that is placed into a queue that is associated with a temperature sensor may indicate whether the temperature is high enough to warrant an immediate shutdown or that continued monitoring is needed. An event that is placed into a queue that is associated with an I/O system may indicate the location of the error, the hub in which the error occurred, and the scope of the error.

The queues are associated with partition firmware 312. In these illustrative examples, event 302 is placed into a particular queue based on the type of event. For example, all events relating to temperature may be placed into queue 308, while all events relating to system bus failures are placed into queue 310. Depending on the number of different types of events, different numbers of queues may be associated with partition firmware 312. Further, other mechanisms may be used to identify events other than by placing events into queues based on event types. For example, identifiers may be associated with events in which each identifier provides an indication of a type of event.

Since the partition in which operating system 304 is located does not own the interrupt presentation hardware, operating system 304 sends call 314 to platform firmware in platform 300 to obtain the source and priority of the interrupt. The interrupt presentation hardware is used to queue or store interrupts destined for a processor or pool of processors. An interrupt is selected for presentation to the processor based on having the current highest priority. This hardware is programmed by the platform firmware. In response, platform 300 returns response 316, containing the source number for the interrupt. In these examples, the interrupt source number is one that cannot be processed by operating system 304. This source number is presented to operating system 304 in a special node of the device tree, the "eventsources node", as a platform specific interrupt source. Operating system 304 does not know about partition firmware queues, but only knows that it has received a list of interrupt sources, which operating system 304 enables during its boot process so that operating system 304 can actually receive these interrupts at runtime. The device tree is a hierarchical data structure, presented by partition firmware 312 to operating system 304 at boot time that describes the hardware owned by the partition and user configuration choices. Additionally, the data structure includes a description of the device drivers and support routines that may be used. The structure of this device tree mimics the organization of the system hardware and may be viewed as a hierarchy of interconnected buses and their attached devices.

Operating system 304 receives one of these interrupt numbers as the source from the platform firmware, the operating system calls partition firmware to find out exactly what happened. In this example, operating system 304 then sends check interrupt cause message 318 to partition firmware 312. This message causes partition firmware 312 to search for the event corresponding to the specific interrupt source identified by the source number. In particular, partition firmware 312 checks queues 308 or 310, depending on the source number. Each queue is used to hold a particular type of event. This source number corresponds to a type of event. With an identification of the type of event, partition firmware 312 is able to identify a queue in which to search for events.

In most cases, only a single event will be found in the queue because the interrupt ensures an immediate response from the operating system. However, the mechanism of the present invention may support handling multiple events in a single queue in the event that the platform firmware places another event into the queue before the first event has been processed. In this situation, the operating system design is that once an error log is received from the partition firmware, the operating system will call the partition firmware once again to make sure no other outstanding events are present.

Once partition firmware 312 finds the event associated with the interrupt number, the nature and severity of the event is analyzed. In these illustrative examples, an event in a queue contains information about the event in addition to the identification of the event. Depending on the results of the analysis, the results of partition firmware 312 may initiate one or more actions or processes. These actions may be, for example, corrective actions or preventative actions.

If partition firmware 312 tries to take corrective action and is successful, error log 320 is returned to operating system 304 as an informational log to indicate that the event has been handled and that no further action is necessary. On the other hand, if partition firmware 312 decides not to initiate an action or the initiated action is unsuccessful, error log 320 then describes the problem in a format for use by operating system 304.

When operating system 304 receives error log 320, this error log is ignored if the log is merely informational. Otherwise, operating system 304 analyzes the information in error log 320 and selects an appropriate action to initiate based on this information. These actions may be, for example, preventive or corrective actions to insure data integrity. These actions include, for example, backing data in memory onto a disk, using input/output (I/O) operations, and suspending kernel services. Further, depending on the severity of the event, operating system 304 may monitor the condition causing the generation of the event. This monitoring may occur through sensors accessed through partition firmware 312. Additionally, operating system 304 may decide to shut down or restart the data processing system with appropriate restart policies based on the error information in error log 320.

Figure 4:
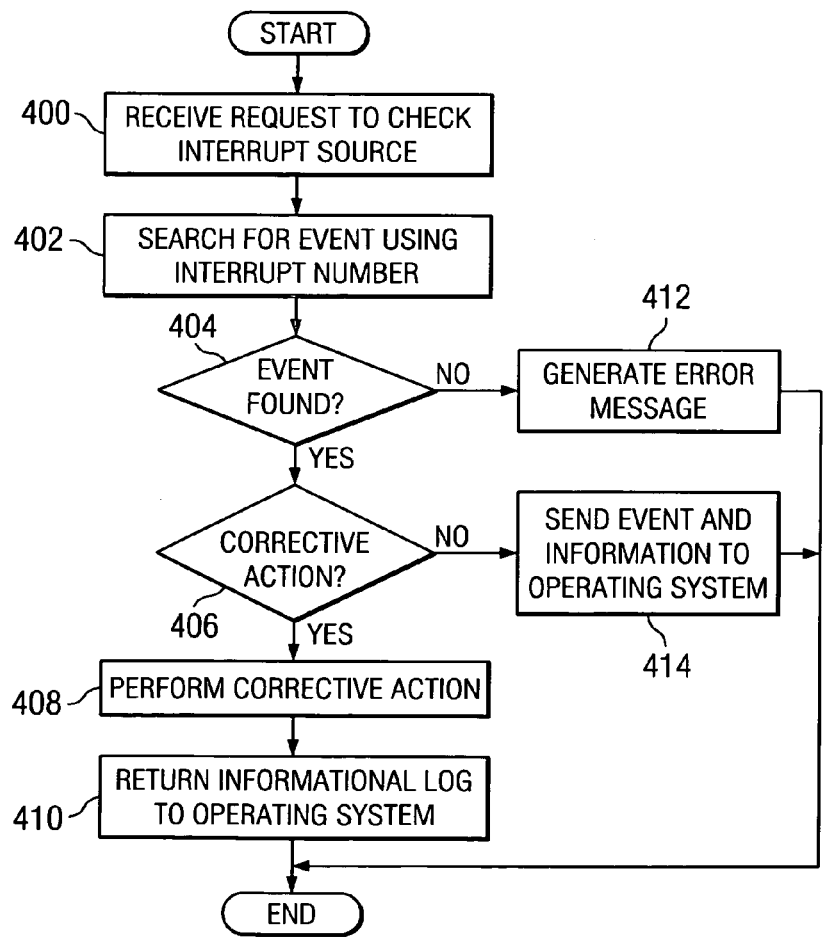
FIG. 4 is a flowchart of a process for processing a request for an interrupt check in accordance with a preferred embodiment of the present invention.

With reference now to FIG. 4, a flowchart of a process for processing a request for an interrupt check is depicted in accordance with a preferred embodiment of the present invention. The process illustrated in FIG. 4 may be implemented in partition firmware, such as partition firmware 312 in FIG. 3.

The process begins by receiving a request to check an interrupt source (step 400). In these examples, the request includes an interrupt number obtained from the platform. Next, a search for an event is performed using the interrupt number (step 402). In these illustrative examples, the interrupt number is used to identify a queue associated with a partition in which the event may be located. Then, a determination is made as to whether the event is found (step 404).

If the event is found, the process then proceeds to make a determination as to whether corrective action is needed (step 406). If corrective action is needed, then corrective action is performed (step 408). Next, an informational log is returned to an operating system (step 410) with the process terminating thereafter. As described above, this informational log indicates that the event has been taken care of and that no further action is needed.

Referring back to step 404 as described above, if an event is not found, then an error message is generated (step 412) with the process terminating thereafter. This message indicates that an event corresponding to the interrupt number could not be found. Turning back to step 406 as described above, if corrective action is not needed then the event and information is sent to the operating system (step 414) with the process terminating thereafter.

With reference now to FIG. 5, a flowchart of a process for handling an interrupt by an operating system is depicted in accordance with a preferred embodiment of the present invention. The process illustrated in FIG. 5 may be implemented in an operating system, such as operating system 304 in FIG. 3.

The process begins by receiving an interrupt from the platform (step 500). In these examples, the interrupt is a hardware interrupt. Next, a source for the interrupt is requested from the platform (step 502). Then, a response identifying the interrupt number is received from the platform (step 504). A request to partition firmware is sent to check the interrupt number (step 506). Next, a response is received (step 508). This response is an error log that may take various forms. For example, the response may merely be an informational error log or may contain error information for use by the operating system.

A determination is then made as to whether the response is an informational response (step 510). If the response is informational, then the error log is stored (step 512) with the process terminating thereafter. Referring back to step 510 as described above, if the response is not informational, then an action is initiated (step 514) with the process terminating thereafter. As described above, many different actions may be initiated based on the error log. These actions may be preventative or corrective depending on the particular event.

Thus, the present invention provides a method, apparatus, and computer instructions for efficiently handling events generated by hardware in a platform. The mechanism of the present invention generates or raises a hardware interrupt to initiate handling of the event by the operating system or partition firmware. Information regarding the event is placed into a queue for use by the partition firmware. The operating system identifies the source of the hardware interrupt and uses this identification to have the partition firmware search for the event. Once the event has been identified, the event is processed by the partition firmware and actions may be initiated by the partition firmware or by the operating system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the mechanism of the present invention is described with respect to a logically partitioned data processing system. This mechanism may be applied to other types of data processing systems, such as those with only a single partition. In a non logical partition data processing system, the partition firmware is essentially the same as described above. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system having at least two partitions, a platform, partition firmware, and abstracted hardware owned by the platform and not owned by the at least two partitions, wherein the method is for generating a notification of an event caused by the abstracted hardware, the method comprising:

responsive to detecting the event caused by the abstracted hardware in the platform, storing, by the platform, the event in a queue associated with the partition firmware before an interrupt is issued;

generating, by the platform, an external hardware interrupt for the event, wherein the platform sends the external hardware interrupt to an operating system operating on a first partition of the at least two partitions;

responsive to receiving, by the partition firmware, a request from the operating system to read the external hardware interrupt, providing a source of the event to the operating system;

responsive to receiving, by the partition firmware, a request from the operating system to query the queue for the external hardware interrupt identifying, by the partition firmware, the event in the queue; and responsive to identifying the event, processing the event.

2. The method of claim 1, wherein processing the event includes:

initiating a corrective action; and sending the notification to the operating system.

3. The method of claim 2, wherein the notification is an informational log.

4. The method of claim 1, wherein processing the event includes:

sending an error log to the operating system.

5. The method of claim 4 further comprising:

responsive to receiving the error log at the operating system, performing by the operating system at least one of a corrective action and a preventative action.

6. The method of claim 1, wherein the event is one of a thermal event or a power event.

7. The method of claim 1, wherein processing the event results in at least one of backing of data in a memory to a disk, freezing input/output operations, suspending kernel services, and monitoring the platform for additional events.

8. The method of claim 1, wherein the event has an event type and wherein the queue is associated with the event type.

9. The method of claim 1, wherein each partition of the at least two partitions includes the operating system.

10. A data processing system, having at least two partitions, a platform, partition firmware, and abstracted hardware owed by the platform and not owned by the at least two partitions, wherein the data processing system is for generating a notification of an event, the data processing system comprising:

generating means, responsive to detecting the event caused by the abstracted hardware in the platform, for generating by the platform an external hardware interrupt for the event, wherein the platform sends the external hardware interrupt to an operating system operating on a first partition of the at least two partitions;

storing means, responsive to the event, for storing the event by the platform in a queue associated with the partition firmware before an interrupt is issued;

providing means, responsive to receiving, by the partition firmware, a request from the operating system to read the external hardware interrupt, for providing a source of the event to the operating system;

identifying means, responsive to receiving, by the partition firmware, a request from the operating system to query the queue for the external hardware interrupt, for identifying, by the partition firmware, the event in the queue; and processing means, responsive to identifying the event, for processing the event.

11. The data processing system of claim 10, wherein the processing means includes:

initiating means for initiating a corrective action; and sending means for sending the notification to the operating system.

12. The data processing system of claim 11, wherein the notification is an informational log.

13. The data processing system of claim 10, wherein the processing means includes:

sending means for sending an error log to the operating system.

14. The data processing system of claim 13 further comprising:

performing means, responsive to receiving the error log at the operating system, for performing by the operating system at least one of a corrective action and a preventative action.

15. The data processing system of claim 10, wherein the event is one of a thermal event or a power event.

16. The data processing system of claim 10, wherein the processing means results in at least one of backing of data in a memory to a disk, freezing input/output operations, suspending kernel services, and monitoring the platform for additional events.

17. The data processing system of claim 10, wherein the event has an event type and wherein the queue is associated with the event type.

18. The data processing system of claim 10, wherein each partition of the at least two partitions includes the operating system.

19. A computer program product in a recordable-type medium for generating a notification of an event in a data processing system having at least two partitions, a platform, partition firmware, and abstracted hardware owned by the platform and not owned by the at least two partitions, wherein the event is caused by the abstracted hardware, the computer program product comprising:

first instructions, responsive to detecting the event caused by the abstracted hardware in the platform, for storing, by the platform, the event in a queue associated with the partition firmware before an interrupt is issued;

second instructions for generating, by the platform; an external hardware interrupt for the event, wherein the platform sends the external hardware interrupt to an operating system operating on a first partition of the at least two partitions;

third instructions, responsive to receiving by the partition firmware a request from the operating system to read the external hardware interrupt, for providing a source of the event to the operating system;

fourth instructions, responsive to receiving by the partition firmware a request from the operating system to query the queue for the external hardware interrupt, for identifying, by the partition firmware, the event in the queue; and fifth instructions for, responsive to identifying the event, processing the event.

20. The computer program product of claim 19, wherein the fourth instructions include:

first sub-instructions for initiating a corrective action; and second sub-instructions for sending the notification to the operating system.

21. The computer program product of claim 20, wherein the notification is an informational log.

22. The computer program product of claim 19, wherein the fourth instructions include:
sub-instructions for sending an error log to the operating system.

23. The computer program product of claim 22 further comprising:
sixth instructions, responsive to receiving the error log at the operating system, for performing by the operating system at least one of a corrective action and a preventative action.

24. A data processing system comprising:
a platform;
a bus system owned by the platform;
at least two partitions owned by the platform;
partition firmware owned by the platform;
abstracted hardware owned by the platform and not owned by the at least two partitions;
a memory connected to the bus system, wherein the memory includes a set of instructions for generating a notification of an event caused by the abstracted hardware; and
a processing unit connected to the bus system, wherein the processing unit executes a set of instructions to:
responsive to detecting the event caused by the abstracted hardware in the platform, storing, by the platform, the event in a queue associated with the partition firmware before an interrupt is issued;
generating, by the platform, an external hardware interrupt for the event, wherein the platform sends the external hardware interrupt to an operating system operating on a first partition of the at least two partitions;
responsive to receiving, by the partition firmware, a request from the operating system to read the external hardware interrupt, providing a source of the event to the operating system;
responsive to receiving, by the partition firmware, a request from the operating system to query the queue for the external hardware interrupt, identifying, by the partition firmware, the event in the queue; and
responsive to identifying the event, processing the event.

\* \* \* \* \*